United States Patent
Jiang et al.

(10) Patent No.: US 8,394,735 B2
(45) Date of Patent: Mar. 12, 2013

(54) CATALYST FOR ULTRA-DEEP DESULFURIZATION OF DIESEL VIA OXIDATIVE DISTILLATION, ITS PREPARATION AND DESULFURIZATION METHOD

(75) Inventors: Zongxuan Jiang, Dalian (CN); Can Li, Dalian (CN); Yongna Zhang, Dalian (CN); Hongying Lv, Dalian (CN)

(73) Assignee: Dalian Institute of Chemical Physics, Chinese Academy of Sciences, Dalian (CN)

( * ) Notice: Subject to any disclaimer, the term of this patent is extended or adjusted under 35 U.S.C. 154(b) by 585 days.

(21) Appl. No.: 12/665,905

(22) PCT Filed: Oct. 24, 2008

(86) PCT No.: PCT/CN2008/001797
§ 371 (c)(1),
(2), (4) Date: Dec. 21, 2009

(87) PCT Pub. No.: WO2009/062390
PCT Pub. Date: May 22, 2009

(65) Prior Publication Data
US 2010/0181230 A1    Jul. 22, 2010

(30) Foreign Application Priority Data
Oct. 24, 2007 (CN) .......................... 2007 1 0176267

(51) Int. Cl.
*C10G 57/00* (2006.01)
(52) U.S. Cl. ........ 502/164; 502/162; 208/226; 208/236; 208/283; 208/289
(58) Field of Classification Search ...... 208/208 R–246, 208/283, 289; 423/286, 297, 305–306, 326; 556/57, 64; 502/162, 164
See application file for complete search history.

(56) References Cited

U.S. PATENT DOCUMENTS

| | | | |
|---|---|---|---|
| 5,958,224 A | 9/1999 | Ho et al. | |
| 6,160,193 A | 12/2000 | Gore | |
| 6,174,785 B1 | 1/2001 | Parekh et al. | |
| 6,402,939 B1 | 6/2002 | Yen et al. | |
| 6,402,940 B1 | 6/2002 | Rappas | |
| 6,500,219 B1 | 12/2002 | Gunnerman | |
| 2007/0051667 A1* | 3/2007 | Martinie et al. | 208/208 R |

FOREIGN PATENT DOCUMENTS

| | | |
|---|---|---|
| CN | 1534082 | * 10/2004 |
| CN | 1534082 A | 10/2004 |
| CN | 1660498 A | 8/2005 |
| CN | 1869164 A | 11/2006 |
| CN | 1872958 A | 12/2006 |
| CN | 101003744 A | 7/2007 |
| CN | 101007284 A | 8/2007 |
| CN | 101050378 A | 10/2007 |
| CN | 200610011979.8 | 11/2007 |
| CN | 101173179 A | 5/2008 |

OTHER PUBLICATIONS

Sinnott, R.K. (2005). Chemical Engineering Design, 4$^{th}$ ed., Butterworth-Heinemann, 1038 pgs.*

* cited by examiner

*Primary Examiner* — Brian McCaig
(74) *Attorney, Agent, or Firm* — VLP Law Group LLP; Enshan Hong

(57) ABSTRACT

A catalyst for ultra-deep desulfurization of diesel via oxidative distillation is an amphiphilic oxidative catalyst, which is expressed as $Q_m[XM_nO_q]$, wherein $1 \leq m \leq 12$; $9 \leq n \leq 18$; $34 \leq q \leq 62$; Q is a quaternary ammonium cation; X is P, Si, As or B; and M is Mo) or W. A desulfurization method comprises a) mixing well a diesel, the amphiphilic catalyst, and hydrogen peroxide, reacting for 10-300 minutes at ambient temperature and normal pressure, transforming the sulfur-containing compounds in the diesel into sulfone to obtain an oxidized diesel; b) distilling the oxidized diesel obtained in step a) under reduced pressure to obtain the ultra-low sulfur diesel having a sulfur content of less than 10 ppm; and c) separating and recovering the catalyst and sulfone.

1 Claim, No Drawings

_US 8,394,735 B2_

CATALYST FOR ULTRA-DEEP DESULFURIZATION OF DIESEL VIA OXIDATIVE DISTILLATION, ITS PREPARATION AND DESULFURIZATION METHOD

PRIORITY CLAIM

This is a U.S. national stage of application No. PCT/CN2008/001797, filed on Oct. 24, 2008. Priority is claimed on the following application: China Application No. 200710176267.6, Filed Oct. 24, 2007, the content of which is/are incorporated here by reference.

FIELD OF THE INVENTION

This invention relates to a catalyst for ultra-deep desulfurization of diesel via oxidative distillation and a method for preparation thereof This invention also relate to a process for ultra-deep desulfurization of diesel via oxidative distillation.

BACKGROUND OF THE INVENTION

SOx produced from the burning of organic sulfur-containing compounds present in fuel oils not only can cause acid rain, pollute air, and harm human health, but also can poison irreversibly the three-way catalysts in the tail gas cleanup systems of engines. Therefore, it has been receiving much attention. The refining of distillates is an essential and important process for removing the heteroatoms such as sulfur, nitrogen and the like present in fuel oils in order to meet the requirements on environmental protection. A conventional refining process is hydrorefining, that is to say, the transformation of the organic sulfur-containing and the organic nitrogen-containing compounds by hydrogenation into $H_2S$ and $NH_3$, respectively to achieve the goal of removing sulfur and nitrogen. Although the conventional hydrorefining process is effective, the following problems still exist: 1. High investment costs because of setting up the high temperature and high pressure treatment units and the units for hydrogen production (if there is no reforming hydrogen) and sulfur recovery, 2. High operating costs due to high temperature, high pressure, and hydrogen consumption during the process, 3. Environmental pollution due to toxic $H_2S$ produced in the process, and 4. Hydrorefining being very effective in removing the sulfur-containing compounds of non-thiophenes, but being very difficult in removing the sulfur-containing compounds of thiophenes, especially, benzothiophene and dibenzothiophene and their derivatives. It is absolutely necessary to reclaim the existing hydrorefining units and to increase operating temperature and hydrogen partial pressure to remove the sulfur-containing compounds. However, it is certain that this brings about a number of problems including high investment, high operating cost, reduction of the catalyst cycle length, and reduction of the quality of the oil products. As the environmental protection regulations are increasingly strict, there is an urgent need for a more economic, more environmental friendly, and more effective production method of ultra-low sulfur diesel (having a sulfur content of less than 10 ppm sulfur).

U.S. Pat. No. 6,160,193 discloses a desulfurization method for distillate oil, which comprises selectively oxidizing the sulfur-containing and nitrogen-containing compounds present in the distillate oil into the corresponding oxides of sulfur and nitrogen compounds to increase the polarity thereof, and then extracting the oxides by using an solvent which is immiscible with the hydrocarbons in the distillate oil to achieve the goal of desulfurization and denitrogenation. The strong oxidants used in the patent are strong acidic oxidants such as perboric acid, persulfuric acid and the like and the reaction temperature is relatively high. The process inevitably causes the side reaction and damages the quality of diesel. In addition, the strong acidic oxidants are strong corrosive to the equipment and are environmental unfriendly as well.

U.S. Pat. No. 6,274,785 improves the above patent through using peracetic acid as oxidant instead of the strong acidic oxidant. However, it is unfavorable for decrease of the operating cost due to using a relatively large amount of peracetic acid as oxidant consumed during the process. In the meantime, peracetic acid is very strong corrosive to the equipment and is environmental unfriendly as well.

U.S. Pat. No. 6,402,940 discloses a desulfurization method for distillate oil, which comprises reacting a sulfur-containing fuel oil with a mixture solution of oxidant and extractant (a mixture solution consisting of a small amount of hydrogen peroxide, a large amount of formic acid and less than 25 wt % of water) at 50-130° C., and then separating aqueous solution from oil, and then removing a small amount of the residual formic acid and water by distillation, and drying the oil by using calcium oxide, and then removing the sulfone left in the oil by passing the obtained oil through a adsorption column with alumna adsorbent. This desulfurization process is environmental unfriendly because of using a large amount of formic acid. In addition, the operating temperature is relatively high, and there are a lot of side reactions. This not only consumes a great deal of hydrogen peroxide, and increases operating cost, but also damages the quality of petroleum products (for example, colority etc.).

An aqueous-organic biphasic system is used in the above three patents so that the reaction rate is slow. The reaction rate in the biphasic systems is often increased by increasing the reaction temperature.

Other methods are also used to improve the reaction rates. For example, U.S. Pat. No. 6,402,939 and U.S. Pat. No. 6,500,219 disclose a desulfurization method for a fuel oil, which comprises combining the fuel oil with an alkyl hydroperoxide (or hydrogen peroxide), a surfactant, and a metal catalyst (for example molybdate etc.) to form an mixture, and placing a container containing the mixed solution into an ultra-sound generator at a temperature of 75° C., oxidizing the sulfur-containing compounds in the oil into sulfone or/and sulfoxide, extracting the sulfone or/and sulfoxide from the oil by using a polar extractant to achieve the goal of desulfurization. Although the ultra-sound, the surfactant, and the catalyst used in the patent can accelerate the reaction rates; the reaction temperature is still relatively high (>70° C.). This inevitably brings about a lot of side reactions, consumes a great deal of hydrogen peroxide, increases the operating cost, and damages the quality of diesel (for example, colority etc.) as well. Moreover, the patent does not mention how to recover the surfactant and the catalyst.

U.S. Pat. No. 5,958,224 also discloses a process for deep desulfurization by combining a hydrotreatment with an oxidation, which comprises reacting the sulfur-containing compounds in the hydrotreated fuel oils with a peroxy-metal complex oxidant, oxidizing the sulfur-containing compounds into sulfone, and then removing the sulfone by adsorbing through an adsorption column with an adsorbent. Because the catalyst used in the process is immiscible with the fuel oil, it can be only dissolved in chloro-containing hydrocarbons (such as $CH_2Cl_2$), which is environmental unfriendly due to its toxicity.

Chinese Patents (having application Nos. of 03107599.1, 200510073771.4, 200610001691.2, 200610001376.X, 200610011979.8) disclose a process for ultra-deep desulfurization of a pre-hydrorefined diesel oil, which comprises agitating well the mixture consisting of the hydrorefined diesel, an aqueous hydrogen peroxide solution, and an amphiphilic catalyst, transforming the sulfur-containing compounds in the diesel into sulfone or/and sulfoxide under relatively mild reaction conditions (at a reaction temperature $\leqq 60°$ C., at atmospheric pressure) to obtain an oxidized diesel, removing selectively the most of sulfone or/and sulfoxide form the oxidized diesel through a polar extractant to obtain ultra-low sulfur diesel. At present, some challenging problems still exist in oxidation-extraction desulfurization processes: 1. High installation investment costs and raw materials costs necessary for separation and recovery of extractants; 2. Extractants involved including nitrogen-containing compounds, such as acetonitrile, dimethylformamide etc., which is environmental unfriendly; 3. Low yield of ultra-low sulfur diesel; and 4. Difficult to recover catalyst.

SUMMARY OF THE INVENTION

An objective of the instant invention is to provide a catalyst for ultra-deep desulfurization of diesel via oxidative distillation and a method for preparation thereof. The catalyst can selectively oxidize 4,6-dimethyl dibenzothiophene and its derivatives being hard to remove present in diesel, which can achieve the oxidization under ambient temperature and normal pressure, and the catalyst can be recovered and reused.

Another objective of the instant invention is to provide a method for ultra-deep desulfurization of diesel via oxidative distillation by using the catalyst, wherein the method uses hydrogen peroxide as oxidant, and can lower the sulfur content in the diesel to ultra-low level.

To achieve the above objectives, according to one aspect of the instant invention, it provides a catalyst for ultra-deep desulfurization of diesel via oxidative distillation, which is an amphiphilic oxidative catalyst and expressed as $Q_m[XM_nO_q]$, wherein $1 \leqq m \leqq 12$; $9 \leqq n \leqq 18$; $34 \leqq q \leqq 62$;

Q is a quaternary ammonium salt cation;

X is phosphorus, silicon, arsenic or boron;

M is molybdenum or tungsten.

Preferably, the quaternary ammonium salt cation (Q) has at least one alkyl chain containing 8~18 carbon atoms.

Preferably, the quaternary ammonium salt cation (Q) is selected from the group consisting of:

$(C_8H_{17})_4N^+$, $(C_8H_{17})_3CH_3N^+$, $(C_8H_{17})_2(CH_3)_2N^+$, $(C_8H_{17})(CH_3)_3N^+$, $(C_{12}H_{25})_4N^+$, $(C_{12}H_{25})_3CH_3N^+$, $(C_{12}H_{25})_2(CH_3)_2N^+$, $(C_{12}H_{25})(CH_3)_3N^+$, $(C_{16}H_{33})_4N^+$, $(C_{16}H_{33})_3(CH_3)N^+$, $(C_{16}H_{33})_2(CH_3)_2N^+$, $(C_{16}H_{33})(CH_3)_3N^+$, $(\pi-C_5H_5N^+C_{16}H_{33})$, $[(C_{18}H_{37})(75\%)+(C_{16}H_{33})(25\%)]_2N^+(CH_3)_2$, $(CH_{18}H_{37})_2N^+(CH_3)_2$, and $(C_{18}H_{37})N^+(CH_3)_3$.

Preferably, the catalyst is selected from the group consisting of:

$[C_{18}H_{37}N(CH_3)_3]_7[PW_{10}O_{36}]$, $[C_{12}H_{25}N(CH_3)_3]_7[PW_{10}O_{36}]$, $[C_{16}H_{33}N(CH_3)_3]_7[PW_{10}O_{36}]$, $[(C_{18}H_{37})_2N(CH_3)_2]_3[(C_{16}H_{33})_2N(CH_3)_2]_4[PW_{10}O_{36}]$, $[C_8H_{17}N(CH_3)_3]_7[PW_{10}O_{36}]$, $[C_{18}H_{37}N(CH_3)_3]_9[PW_9O_{34}]$, $[C_{18}H_{37}N(CH_3)_3]_{12}[P_2W_{15}O_{56}]$, $[C_{18}H_{37}N(CH_3)_3]_{10}[P_2W_{17}O_{61}]$, $[C_{18}H_{37}N(CH_3)_3]_8[SiW_{10}O_{36}]$, $[C_{18}H_{37}N(CH_3)_3]_9[BW_{10}O_{36}]$, $[C_{18}H_{37}N(CH_3)_3]_7[AsW_{10}O_{36}]$, $[C_{18}H_{37}N(CH_3)_3]_7[PMo_{10}O_{36}]$, $[C_{12}H_{25}N(CH_3)_3]_7[PMo_5W_5O_{36}]$, and $[C_{18}H_{37}N(CH_3)_3]_7[PW_{11}O_{39}]$.

According to another aspect of the instant invention, it provides a preparation method of the above catalyst, comprising the steps of adding a dissolvable salt of M, a dissolvable salt of X, and a quaternary ammonium salt to an aqueous hydrogen peroxide solution.

Preferably, the dissolvable salt of M, the dissolvable salt of X, and the quaternary ammonium salt are added in said order.

Preferably, the dissolvable salts of M are selected from the group consisting of ammonium metatungstate, sodium tungstate, sodium molybdate, and ammonium molybdate.

Preferably, the dissolvable salts of X are selected from the group consisting of sodium phosphate, sodium borate, sodium arsenate, and sodium silicate.

Preferably, quaternary ammonium salts are selected from the group consisting of chlorides of $(C_8H_{17})_4NCl$, $(C_8H_{17})_3CH_3NCl$, $(C_8H_{17})_2(CH_3)_2NCl$, $(C_8H_{17})(CH_3)_3NCl$, $(C_{12}H_{25})_4NCl$, $(C_{12}H_{25})_3CH_3NCl$, $(C_{12}H_{25})_2(CH_3)_2NCl$, $(C_{12}H_{25})(CH_3)_3NCl$, $(C_{16}H_{33})_4NCl$, $(C_{16}H_{33})_3(CH_3)NCl$, $(C_{16}H_{33})_2(CH_3)_2NCl$, $(C_{16}H_{33})(CH_3)_3NCl$, $(\pi-C_5H_5NC_{16}H_{33})Cl$, $[(C_{18}H_{37})(75\%)+(C_{16}H_{33})(25\%)]_2N(CH_3)_2Cl$, $(C_{18}H_{37})_2N(CH_3)_2Cl$, and $(C_{18}H_{37})N(CH_3)_3Cl$.

Furthermore, according to a further aspect of the instant invention, it provides A method for ultra-deep desulfurization of diesel via oxidative distillation, comprising the steps of: a) mixing well a feedstock diesel, a catalyst according to the instant invention, and hydrogen peroxide at ambient temperature and normal pressure, transforming the sulfur-containing compounds present in the feedstock diesel into sulfone to obtain an oxidized diesel; b) distilling the oxidized diesel obtained in step a) under reduced pressure to obtain an ultra-low sulfur diesel having a sulfur content of less than 10 ppm; and c) separating and recovering the catalyst and sulfone.

In the method, said feedstock diesel is a hydrogenation diesel or straight run diesel having a sulfur content of 50 ppm~2000 ppm. In the method, the mass ratio of the amphiphilic catalyst to the feedstock diesel is 1:2000~1:10000. In the method, the amount of hydrogen peroxide is related to the amount of sulfur-containing compounds in diesel, and the molar ratio of hydrogen peroxide to the sulfur-containing compounds is 1:2~1:6. In the method, the reaction is performed for 10~300 minutes.

Compared with the known art, the instant invention has the following advantages:

1. It has selective oxidation capacity for sulfur-containing compounds, especially 4,6-dimethyl dibenzothiophene and its derivatives being hard to remove in the diesel which can achieve the oxidation at ambient temperature and normal pressure. This decreases greatly the investment costs and operating costs; 2. The catalyst can be recovered and reused, which not only reduces the cost of production, but also prevents the catalyst residue from keeping in diesel and damaging the quality of fuels; 3. Hydrogen peroxide is used as oxidant, which has no pollution on environment; and 4. The sulfur content in the diesel can be lowered to ultra-low sulfur level (having a sulfur content of less than 10 ppm).

BEST MODES FOR CARRYING OUT THE INVENTION

The following examples are illustrated for purpose of further explaining the invention, which are not intended to limit the scope of the invention as defined in the attached claims.

Example 1

Preparation of Catalyst 1.87 grams sodium tungstate was weighed, and put in 10.0 ml aqueous hydrogen peroxide solution (wherein the concentration of hydrogen peroxide is 30% by weight), stirred violently for 30 minutes in oil bath at 60° C., dissolved and cooled to room temperature. 0.44 grams sodium dihydrogen phosphate was weighed and dissolved in 5 ml water, stirred for 5 minutes at room temperature, which was added into the aqueous hydrogen peroxide solution of sodium tungstate and stirred. 2.6 grams $(C_{12}H_{25})(CH_3)_3NCl$ was taken and dissolved in 10 ml water which is added into the above mixed solution dropwise while stirring violently, over 2 h wherein a white precipitate was immediately formed, and the stirring was continued for 3 hours. Finally a white powered solid called Catalyst A (2.88 grams) was obtained by filtration, washing with deionized water and drying under vacuum. Catalyst A was expressed as $[C_{12}H_{25}N(CH_3)_3]_9[PW_9O_{34}]$ through element analysis [X-ray Fluorescence (XRF), inductively coupled plasma-atomic emission spectroscopy (ICP)].

Example 2

Desulfurization of Diesel (1) 100 ml of hydrorefining diesel having a sulfur content of 755 ppm was placed in an Erlenmeyer flask. Then, At 60° C., 0.01 gram of the Catalyst A was added thereto, followed by 1 ml of 30% aqueous hydrogen peroxide solution, and stirred violently for 60 minutes; (2) The resultant oxidized diesel was distilled under reduced pressure at a distillation temperature of 190° C. and a pressure of 5 kPa to obtain a low sulfur diesel having sulfur content of less than 10 ppm. Experimental result was listed in table 1.

Example 3

Except that the distillation temperature was 200° C. and the pressure was 4 kPa, other operating conditions were similar to Example 2.

Example 4

Operating procedures were identical to Example 1 except that the molar ratio of phosphorus and tungsten was 1:1 (namely, sodium tungstate, 2.938 grams; sodium dihydrogen phosphate, 1.2 grams) and $(C_8H_{17})_3CH_3NCl$ (2.075 grams) was used. The catalyst obtained was referred as Catalyst B (3.81 grams). Catalyst B was expressed as $[C_8H_{17}N(CH_3)_3]_7[PW_{10}O_{36}]$ through element analysis [X-ray Fluorescence (XRF), inductively coupled plasma-atomic emission spectroscopy (ICP)].

Example 5

Operating procedures were identical to Example 1 except that the molar ratio of phosphorus and tungsten was 1:2 (namely, sodium tungstate, 2.938 grams; sodium dihydrogen phosphate, 0.6 grams) and $(C_{12}H_{25})(CH_3)_3NCl$ (2.63 grams) was used. The catalyst obtained was referred as Catalyst C (3.72 grams). Catalyst C was expressed as $[C_{12}H_{25}N(CH_3)_3]_7[PW_{11}O_{39}]$ through element analysis [X-ray Fluorescence (XRF), inductively coupled plasma-atomic emission spectroscopy (ICP)].

Example 6

Operating procedures were identical to Example 1 except that the molar ratio of phosphorus and tungsten was 1:4 (namely, sodium tungstate, 2.938 grams; sodium dihydrogen phosphate, 0.3 grams) and $(C_{16}H_{33})(CH_3)_3NCl$ (3.195 grams) was used. The catalyst obtained was referred as Catalyst D (4.01 grams). Catalyst C was expressed as $[C_{16}H_{33}N(CH_3)_3]_7[PW_{11}O_{39}]$ through element analysis [X-ray Fluorescence (XRF), inductively coupled plasma-atomic emission spectroscopy (ICP)].

Example 7

Operating procedures were identical to Example 1 except that the molar ratio of phosphorus and tungsten was 1:6 (namely, sodium tungstate, 2.938 grams; sodium dihydrogen phosphate, 0.2 grams) and $[(C_{18}H_{37})(75\%)+(C_{16}H_{33})(25\%)]_2N(CH_3)_2Cl$ (5.835 grams) was used. The catalyst obtained was referred as Catalyst D (5.75 grams). Catalyst E was expressed as $[(C_{18}H_{37})_2N(CH_3)_2]_3[(C_{16}H_{33})_2N(CH_3)_2]_4[PW_{10}O_{36}]$ through element analysis [X-ray Fluorescence (XRF), inductively coupled plasma-atomic emission spectroscopy (ICP)].

Example 8

Operating procedures are the same as Example 7 except that the molar ratio of phosphorus and tungsten was as 1:10 (namely, sodium tungstate, 2.938 grams; sodium dihydrogen phosphate, 0.12 grams). The catalyst obtained was referred as Catalyst F (5.43 grams). Catalyst F was expressed as $[(C_{18}H_{37})_2N(CH_3)_2]_3[(C_{16}H_{33})_2N(CH_3)_2]_4[PW_{11}O_{39}]$ through element analysis [X-ray Fluorescence (XRF), inductively coupled plasma-atomic emission spectroscopy (ICP)].

Example 9

Operating procedures are the same as Example 1 except that the molar ratio of phosphorus and tungsten was 1:11 (namely, sodium tungstate, 2.938 grams; sodium dihydrogen phosphate, 0.11 grams). The catalyst obtained was referred as Catalyst G (3.69 grams). Catalyst G was expressed as $[C_{12}H_{25}N(CH_3)_3]_7[PW_{11}O_{39}]$ through element analysis [X-ray Fluorescence (XRF), inductively coupled plasma-atomic emission spectroscopy (ICP)].

Example 10

Operating procedures were identical to Example 2 except that Catalyst B and a hydrogenation diesel having a sulfur content of 50 ppm and 0.1 ml of hydrogen peroxide (30%) were used.

Example 11

Operating procedures were identical to Example 2 except that Catalyst C and a hydrogenation diesel having a sulfur content of 200 ppm and 0.3 ml of hydrogen peroxide (30%) were used.

Example 12

Operating procedures are similar to Example 2 except that Catalyst D and a straight run diesel having a sulfur content of 1200 ppm and 1.6 ml of hydrogen peroxide (30%) were used.

Example 13

Operating procedures were identical to Example 2 except that Catalyst E and a straight run diesel having a sulfur content of 2000 ppm and 3 ml of hydrogen peroxide (30%) were used.

Example 14

Operating procedures were identical to Example 2 except that Catalyst F and a hydrogenation diesel having a sulfur content of 500 ppm and 0.8 ml of hydrogen peroxide (30%) were used.

Example 15

Operating procedures were identical to Example 2 except that Catalyst G and a hydrogenation diesel having a sulfur content of 800 ppm and 1.2 ml of hydrogen peroxide (30%) were used.

Example 16

Operating procedures were identical to Example 1 except that sodium silicate (1.22 grams) instead of sodium dihydrogen phosphate was used. The catalyst obtained was referred as Catalyst H (2.58 grams). Catalyst H was expressed as $[C_{12}H_{25}N(CH_3)_3]_8[SiW_{10}O_{36}]$ through element analysis [X-ray Fluorescence (XRF), inductively coupled plasma-atomic emission spectroscopy (ICP)].

Example 17

Operating procedures were identical to Example 1 except that an aqueous solution of sodium borate (0.658 grams) instead of an aqueous solution of sodium dihydrogen phosphate was used. The catalyst obtained was referred as Catalyst I (2.71 grams). Catalyst I was expressed as $[C_{12}H_{25}N(CH_3)_3]_9[BW_{10}O_{36}]$ through element analysis [X-ray Fluorescence (XRF), inductively coupled plasma-atomic emission spectroscopy (ICP)].

Example 18

Operating procedures were identical to Example 1 except that an aqueous solution of sodium arsenate (1.459 grams) instead of an aqueous solution of sodium dihydrogen phosphate was used. The catalyst obtained was referred as Catalyst J (2.47 grams). Catalyst J was expressed as $[C_{12}H_{25}N(CH_3)_3]_7[AsW_{10}O_{36}]$ through element analysis [X-ray Fluorescence (XRF), inductively coupled plasma-atomic emission spectroscopy (ICP)].

Example 19

Operating procedures were identical to Example 1 except that an aqueous solution of ammonium molybdate (11.64 grams) instead of an aqueous solution of sodium tungstate was used. The catalyst obtained was referred as Catalyst K (19.33 grams). Catalyst K was expressed as $[C_{12}H_{25}N(CH_3)_3]_7[PMo_{10}O_{36}]$ through element analysis [X-ray Fluorescence (XRF), inductively coupled plasma-atomic emission spectroscopy (ICP)].

Example 20

Operating procedures were identical to Example 1 except that the mixture salts of sodium molybdate and sodium tungstate (the molar ratio of molybdenum and tungsten is 1:1) (namely, sodium tungstate: 2.938 grams; sodium molybdate: 1.9 grams) was used. The catalyst obtained was referred as Catalyst L (19.33 grams). Catalyst L was expressed as $[C_{12}H_{25}N(CH_3)_3]_7[PMo_5W_5O_{36}]$ through element analysis [X-ray Fluorescence (XRF), inductively coupled plasma-atomic emission spectroscopy (ICP)].

Example 21

Operating conditions were identical to Example 10 except that Catalyst H was used.

Example 22

Operating conditions were identical to Example 14 except that Catalyst I was used.

Example 23

Operating conditions were identical to Example 13 except that Catalyst J was used.

Example 24

Operating conditions were identical to Example 15 except that Catalyst K was used.

Example 25

Operating conditions were identical to Example 14 except that Catalyst L was used.

TABLE 1

Experimental result

| | Sulfur Content of Feedstock Diesel (ppm) | Catalyst | Catalyst Formula | Sulfur Content of Desulfurized diesel (ppm) | Yield (%) |
|---|---|---|---|---|---|
| Example 2 | 755 | A | $[C_{12}H_{25}N(CH_3)_3]_4H_3[PW_{10}O_{36}]$ | 8 | 99.5 |
| Example 3 | 755 | A | $[C_{12}H_{25}N(CH_3)_3]_4H_3[PW_{10}O_{36}]$ | 7 | 99.6 |
| Example 10 | 50 | B | $[C_{12}H_{25}N(CH_3)_3]_7[PW_{11}O_{39}]$ | 8 | 99.9 |
| Example 11 | 200 | C | $[C_{12}H_{25}N(CH_3)_3]_7[PW_{11}O_{39}]$ | 6 | 99.8 |
| Example 12 | 1200 | D | $[C_{16}H_{33}N(CH_3)_3]_7[PW_{11}O_{39}]$ | 5 | 99.5 |
| Example 13 | 2000 | E | $[(C_{18}H_{37})_2N(CH_3)_2]_3[(C_{16}H_{33})_2N(CH_3)_2]_4[PW_{10}O_{36}]$ | 6 | 99.5 |
| Example 14 | 500 | F | $[(C_{18}H_{37})_2N(CH_3)_2]_3[(C_{16}H_{33})_2N(CH_3)_2]_4[PW_{11}O_{39}]$ | 3 | 99.7 |
| Example 15 | 800 | G | $[C_{12}H_{25}N(CH_3)_3]_7[PW_{11}O_{39}]$ | 6 | 99.8 |
| Example 21 | 50 | H | $[C_{12}H_{25}N(CH_3)_3]_8[SiW_{10}O_{36}]$ | 5 | 99.7 |
| Example 22 | 200 | I | $[C_{12}H_{25}N(CH_3)_3]_9[BW_{10}O_{36}]$ | 7 | 99.6 |
| Example 23 | 2000 | J | $[C_{12}H_{25}N(CH_3)_3]_7[AsW_{10}O_{36}]$ | 9 | 99.8 |
| Example 24 | 800 | K | $[C_{12}H_{25}N(CH_3)_3]_7[PMo_{10}O_{36}]$ | 8 | 99.8 |
| Example 25 | 500 | L | $[C_{12}H_{25}N(CH_3)_3]_7[PMo_5W_5O_{36}]$ | 7 | 99.6 |

The diesels produced by the instant invent all have a sulfur content of less than 10 ppm, meeting the sulfur specifications of European V in the promise of maintaining the yield of diesel product.

The method provided by the instant invention can remove effectively the sulfur-containing compounds such as 4,6-dimethyldibenzothiophene and its derivatives being hard to remove present in hydrogenation diesels or straight run diesels. The catalysts used not only have very high activity and selectivity to organic sulfur-containing compound, but also directly use diesel as solvent and water is the only byproduct of hydrogen peroxide. Therefore, this process is more environmental friendly. Furthermore, the instant invention provides the following advantages: low investment costs for distillation, high yield of ultra-low sulfur diesel (>99.5%), and easy to recover the catalyst used. Economic evaluation indicates that the desulfurization method has the advantage over 30-50% lower investment costs and operating costs than those of a conventional hydrodesulfurization process and has very significant economic benefit.

What is claimed is:

1. A catalyst for ultra-deep desulfurization of diesel via oxidative distillation, wherein the catalyst is an amphiphilic oxidative catalyst selected from the group consisting of: $[C_{18}H_{37}N(CH_3)_3]_7[PW_{10}O_{36}]$, $[C_{12}H_{25}N(CH_3)_3]_7[PW_{10}O_{36}]$, $[C_{16}H_{33}N(CH_3)_3]_7[PW_{10}O_{36}]$, $[((C_{18}H_{37})_2N(CH_3)_2]_3[(C_{16}H_{33})_2N(CH_3)_2]_4[PW_{10}O_{36}]$, $[C_8H_{17}N(CH_3)_3]_7[PW_{10}O_{36}]$, $[C_{18}H_{37}N(CH_3)_3]_9[PW_9O_{34}]$, $[C_{18}H_{37}N(CH_3)_3]_{12}[P_2W_{15}O_{56}]$, $[C_{18}H_{37}N(CH_3)_3]_{10}[P_2W_{17}O_{61}]$, $[C_{18}H_{37}N(CH_3)_3]_8[SiW_{10}O_{36}]$, $[C_{18}H_{37}N(CH_3)_3]_9[BW_{10}O_{36}]$, $[C_{18}H_{37}N(CH_3)_3]_7[AsW_{10}O_{36}]$, $[C_{18}H_{37}N(CH_3)_3]_7[PMo_{10}O_{36}]$, $[C_{12}H_{25}N(CH_3)_3]_7[PMo_5W_5O_{36}]$, and $[C_{18}H_{37}N(CH_3)_3]_7[PW_{11}O_{39}]$.

* * * * *